(12) United States Patent  
Sobel

(10) Patent No.: US 6,324,483 B1  
(45) Date of Patent: Nov. 27, 2001

(54) ANGULAR ACCELERATION TRANSDUCER

(75) Inventor: Jarl Sobel, Västerås (SE)

(73) Assignee: Asea Brown Boveri AB, Vasteras (SE)

( * ) Notice: Subject to any disclaimer, the term of this patent is extended or adjusted under 35 U.S.C. 154(b) by 0 days.

(21) Appl. No.: 09/320,000

(22) PCT Filed: Jul. 6, 1998

(86) PCT No.: PCT/SE98/01323

§ 371 Date: Jun. 16, 1999

§ 102(e) Date: Jun. 16, 1999

(87) PCT Pub. No.: WO99/08085

PCT Pub. Date: Feb. 18, 1999

(30) Foreign Application Priority Data

Aug. 7, 1997 (SE) ..................... 9702879

(51) Int. Cl.$^7$ .......... G01C 19/00; G01C 25/00; G01D 18/00
(52) U.S. Cl. ............. 702/104; 73/116; 73/117.3
(58) Field of Search .............. 702/104; 73/116, 73/117.3; 701/110, 111

(56) References Cited

U.S. PATENT DOCUMENTS

| 4,606,005 | 8/1986 | Ribbens . | |
|---|---|---|---|
| 4,898,025 | 2/1990 | Weyland . | |
| 5,200,899 | 4/1993 | Ribbens et al. . | |
| 5,239,473 | 8/1993 | Ribbens et al. . | |
| 5,287,735 | 2/1994 | Klauber et al. . | |
| 5,824,890 | * 10/1998 | La Palm et al. ............ | 73/117.3 |
| 5,954,784 | * 9/1999 | Inada et al. ............... | 701/110 |
| 6,006,155 | * 12/1999 | Wu et al. .................. | 701/111 |
| 6,062,071 | * 5/2000 | Henn et al. ............... | 73/117.3 |

FOREIGN PATENT DOCUMENTS

| 1538929 | 1/1979 | (GB) . |
| WO 97/48894 | 12/1997 | (WO) . |

\* cited by examiner

*Primary Examiner*—Marc S. Hoff  
*Assistant Examiner*—Demetrius Pretlow  
(74) *Attorney, Agent, or Firm*—Connolly Bove Lodge & Hutz, LLP

(57) ABSTRACT

An angular acceleration transducer measures angular acceleration of a torque-transmitting shaft of a drive device, and includes a measuring shaft having a torque transducer and a transducer flywheel, and which is connected to the torque-transmitting shaft in such a way that it follows rotational movement of the torque-transmitting shaft with a known ratio.

5 Claims, 1 Drawing Sheet

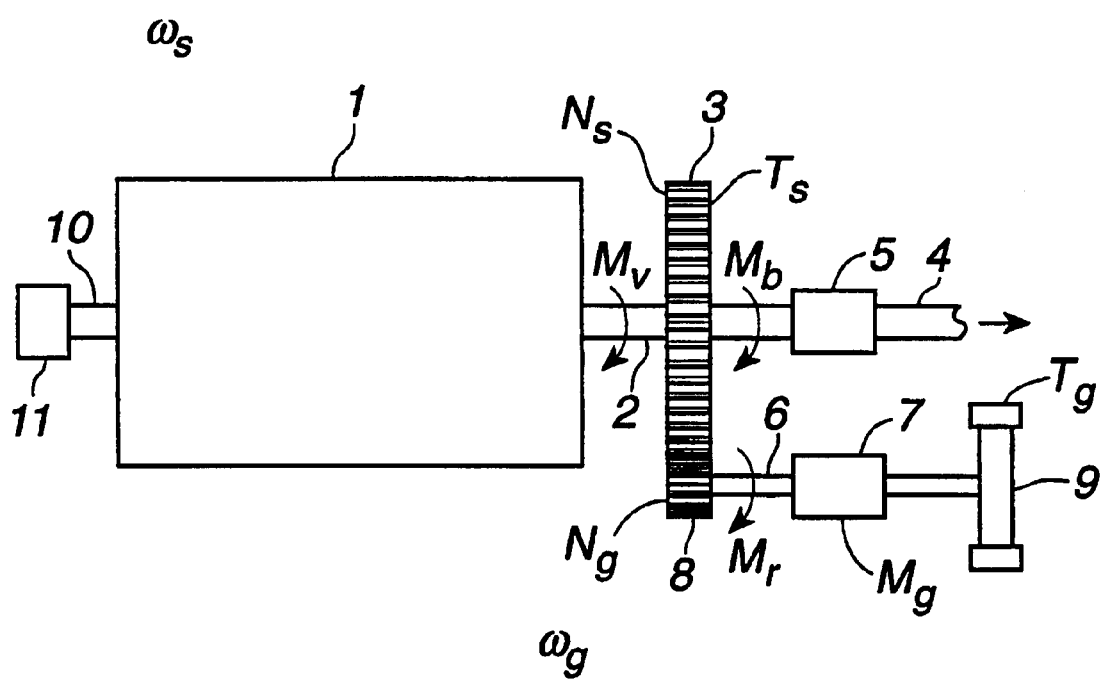

ANGULAR ACCELERATION TRANSDUCER

TECHNICAL FIELD

The present invention relates to an angular acceleration transducer and a use of the angular acceleration transducer, for example in connection with detection of misfiring of internal combustion engines. The angular acceleration transducer may also advantageously be used for detection of torsional oscillations in drive shafts, for example in electric trains and motor cars, etc. The angular acceleration transducer may thus be used in connection with drive devices of various kinds.

A misfire of an internal combustion engine indicates a fault condition which, depending on the nature of the fault, may have more or less serious consequences. To avoid the complications which may arise, it is therefore of great importance, as a first step in eliminating the fault, to be able to detect a misfire as quickly as possible after the occurrence thereof.

If an internal combustion engine misfires, this normally means that guaranteed values of the contents and composition of the exhaust gases cannot be kept. This is one of the most important reasons for the desirability of rapidly detecting a misfire.

There are a plurality of different reasons for the misfiring of an internal combustion engine. A misfire may, for example, be due to a fault in the electric ignition system, incorrect time for ignition, a faulty spark plug, too fat or too thin fuel mixture, etc. The intention of the present invention is to enable, by simple means and independently of the reason for the fault, detection of misfiring in order thus to be able to rapidly initiate measures such that the internal combustion engine may resume a faultless operating state again.

BACKGROUND ART, THE PROBLEMS

The known technique for detecting misfiring is primarily based on two different methods, namely, measuring the rotational speed of the flywheel or crankshaft of the internal combustion engine, or measuring the torque of the crankshaft of the internal combustion engine.

The most commonly used method is based on measurement of the rotational speed of the flywheel. This measurement occurs either instantaneously with the aid of some kind of analog speed sensor, or as a mean value; in which case the measurement is normally digital. Then, an analysis is made of the very small differences in the rotational speed which arise, especially during misfiring, in order to determine whether or not misfiring has occurred. From a purely general point of view, this method is very sensitive to measurement errors and does not function satisfactorily for all loads and speeds.

An embodiment comprising the above method is described in U.S. Pat. No. 5,239,473 "Method and system for detecting the misfire of an internal combustion engine utilizing angular velocity fluctuations". In this case, the rotational speed of the crankshaft and electronic signal processing are utilized. After the speed signal has been processed to reduce random faults and external disturbances, the signal may be utilized in four different described methods of calculation to obtain information as regards the torque developed in each cylinder. This results in a vector with M dimensions for the behaviour of each cylinder for each cycle of the internal combustion engine. Here, M represents the number of cylinders of the engine. By analysis of this vector with the aid of statistical decision theory, it is possible, according to the patent specification, to obtain information about any misfire.

The other method, as mentioned above, comprises directly measuring the torque in the crankshaft. The principle as such functions very well for detecting misfiring. However, the problem is that the application of a torque transducer requires quite an extensive intervention in an existing engine design and is, therefore, not particularly attractive to the automobile industry.

An embodiment comprising this method is described in WO 92/10733 A2, "Engine misfire, knock or roughness detection method and apparatus". The method comprises determining, at regular intervals, the mean and standard deviation of a number of signals originating from torsional stresses of the crankshaft, determining the difference in mean value between consecutive measurements, determining the ratio between this difference and the standard deviation and then comparing the difference against a threshold value. This ratio for a given cylinder is then compared with one or more corresponding ratios for other cylinders in the internal combustion engine. It is further clear from the patent document that magneto-strictive sensors may be used to obtain a measure of the torsional stresses.

As will have been clear from the above description, misfiring of internal combustion engines is detected on the basis of measurement of the rotational speed of the crankshaft or the torque developed in the crankshaft and by means of advanced and extensive analytical and statistical methods. It has also been mentioned that there are problems in connection with the sensitivity to measurement errors when analyzing speed signals and in connection with the application of current measuring transducers and, in particular, with the application of torque transducers.

SUMMARY OF THE INVENTION, EMBODIMENTS

An angular acceleration transducer according to the invention will be described with reference to the accompanying figures which at the same time show a use of the invention, applied to a drive device in the form of an internal combustion engine, for measuring the angular acceleration of the drive device.

A drive device 1 has a driving shaft 2 which is associated with a vibration-equalizing flywheel 3 and an output shaft 4, possibly provided with a torque transducer 5 for determining the load of the drive device. The vibration-equalizing flywheel is provided with a gear ring which, during a starting operation, is in engagement with a gear pinion (not shown) on the shaft of a starting motor.

It should be pointed out that, if the drive device comprises an internal combustion engine, the engine and the load are always on opposite sides of the flywheel, which implies that the torque to the output shaft 4 is filtered by the flywheel.

The angular acceleration transducer comprises
  a measuring shaft 6, which is provided with
  a torque transducer 7
  and that the measuring shaft at one shaft end is provided with a gear pinion
  and that the measuring shaft at the other shaft end is provided with a transducer flywheel 9.

In the embodiment of an angular acceleration transducer shown in the figure, the gear pinion 8 is intended to be continuously in engagement with the teeth in the gear ring of the flywheel. In other embodiments, different connections of the measuring shaft—with sufficient freedom from play—to the rotational movement of the crankshaft, to permit the shaft to measure the oscillations of the crankshaft, may of course be used.

If the drive device is an internal combustion engine, its crankshaft normally has, in addition to the driving shaft 2, a second output shaft 10 for an oscillation damper 11.

It will now be shown that, during constant loading of the drive device, the torque transducer 7 will deliver a measure of the torque of the torque-transmitting shaft. If the drive device comprises an internal combustion engine, the torque transducer will deliver a measure of the torque of the torque-transmitting shaft with the variations to which any misfires may give rise. The advantage of this arrangement is, thus, that it is possible to obtain a measure of the developed torque without interfering with the design of the internal combustion engine. The torque value thus obtained may then form the basis for evaluation of any misfires according to some known method.

The following definitions will be used in the description:

$M_v$=torque developed in the crankshaft $M_b$=torque which is available for the drive wheels via the gearbox $M_r=M_v-M_b$ is the resultant torque which accelerates the transducer flywheel 9

$M_g$=torque measured in the measuring shaft $N_s$=the number of teeth of the gear rim of the flywheel of the internal combustion engine $N_g$=the number of teeth of the gear wheel of the angular acceleration transducer $T_s$=the moment of inertia of the vibration-damping flywheel $T_g$=the moment of inertia of the flywheel of the angular acceleration transducer $\omega_s$=the angular velocity of the flywheel/drive shaft of the drive device/the internal combustion engine $\omega_g$=the angular velocity of the gear pinion/measuring shaft of the angular acceleration transducer.

For an embodiment according to the figure and with the definitions stated above, the angular velocities, in the case of a gear pinion, are connected according to $$\omega_g = N_s \times \omega_s / N_g \tag{1}$$

which results in $$d\omega_s/dt = (d\omega_g/dt) \times N_g/N_s \tag{2}$$

Together with Newton's first law, this implies that the resultant torque which accelerates the transducer flywheel 9 is connected to acceleration of the angular acceleration transducer in accordance with $$M_r = T_s \times d\omega_s/dt = T_s \times N_g \times (d\omega_g/dt)/N_s \tag{3}$$

By measuring the torque $M_g$ in the measuring shaft 4 with the torque transducer 7, the acceleration of the measuring shaft may be determined according to Newton's first law $$d\omega_g/dt = M_g/T_g \tag{4}$$

By inserting (4) in (2), the acceleration of the vibration-damping flywheel of the drive device/the internal combustion engine may be determined as $$d\omega_s/dt = (N_g/N_s) \times M_g/T_g$$

Further, by inserting (4) in (3), the torque transducer on the measuring shaft, in case of a constant load $M_b$, will produce a measure of the torque $M_v$ developed in the crankshaft in accordance with $$M_v - M_b = M_r = (T_s/T_g) \times (N_g/N_s) \times M_g = k \times M_g$$

Generally, an angular acceleration transducer according to the invention may be used for determining the angular acceleration of a torque-transmitting shaft in a plurality of different, both driving and braking, applications. If the gear ratio or the ratio of the measuring shaft to the rotational speed of the torque-transmitting shaft is given as "n", in accordance with the above the following applies $$\omega_g = \omega_s \cdot n$$

and that $$M_r = T_s \times d\omega_s/dt = (d\omega_g/dt) \times T_s/n$$

and, in accordance with the above, that $$d\omega_g/dt = M_g/T_g$$

whereby $$d\omega_s/dt = M_g/(T_g \times n)$$

and that $$M_v - M_b = (T_s/T_g) \times M_g/n = k \times M_g$$

As regards embodiments in other respects, the measuring shaft of the angular acceleration transducer should be designed to give the transducer-flywheel combination such a high resonance frequency that this does not affect the measurement. This requires a torque transducer with little distortion at nominal load, and therefore it is suitable to have a torque transducer of magnetoelastic type.

It may be noted that any hysteresis and linearity deviation of the transducer signal will have little significance in such an application.

In the embodiment with angular acceleration measurement of internal combustion engines described above, the gear ratio between the gear ring and the gear wheel of the angular acceleration transducer should suitably be chosen to be equal with an integer multiple of the number of cylinders divided by two. This implies that the measurement will be practically independent of any dependence of the output signal of the torque transducer on the rotation of the measuring shaft, since this then applies in the same way too all the cylinders.

To be able continuously to measure and compensate for the load of the internal combustion engine, a torque transducer may be mounted around the output shaft of the load.

In another embodiment., the torque transducer may be connected in the leading end of the internal combustion engine, where normally a vibration damper and any other auxiliary systems are mounted. The torque transducer may possibly be integrated into the vibration damper.

The angular acceleration transducer according to the invention may also advantageously be used for detection of torsional oscillations in torque-transmitting shafts of various drive devices, for example in electric locomotives and motor cars, possibly also combined with an anti-brake system if the shaft stops very rapidly when the brakes are applied.

What is claimed is:

1. An angular acceleration transducer for measuring the angular acceleration of a torque-transmitting shaft (2) of a drive device (1), characterized in that the angular acceleration transducer comprises a measuring shaft (6) continuously connected to the torque-transmitting shaft in such a way that it follows the rotational movement of the torque-transmitting shaft with a known ratio "n" between the rotational speed of the measuring shaft and the torque-transmitting shaft and that the measuring shaft is provided with a torque transducer (7) and a transducer flywheel (9), whereby the angular acceleration of the torque-transmitting shaft will be $$d\omega_s/dt = M_g/(T_g \times n)$$

wherein $M_g$ = torque measured in the measuring shaft $T_g$ = the moment of inertia of the flywheel of the angular acceleration transducer $\omega_s$ = the angular velocity of the flywheel/drive shaft n = the ratio between the rotational speed of the measuring shaft and the torque-transmitting shaft.

2. An angular acceleration transducer according to claim 1 for detecting misfiring of drive devices, the torque-transmitting shaft (2) of which is provided with a vibration-damping flywheel (3) with a gear ring with $N_s$ teeth, characterized in that the measuring shaft (6) of the angular acceleration transducer is provided with a gear wheel with a gear ring with $N_g$ teeth in engagement with the teeth of the vibration-damping flywheel, and that the angular acceleration of the torque-transmitting shaft of the drive device will be $d\omega_s/dt = (N_g/N_s) \times M_g/T_g$.

3. An angular acceleration transducer according to claim 1, wherein the drive device (1) is provided with an output shaft (10) for connection of a vibration damper (11) or other auxiliary systems, characterized in that the angular acceleration transducer is connected to the second output shaft.

4. An angular acceleration transducer according to claim 1, characterized in that for continuous measurement and for compensation for the load of the drive device, the angular acceleration transducer is supplemented with a torque transducer (5) mounted around the output shaft (4) of the drive device after the vibration-damping flywheel.

5. Use of an angular acceleration transducer according to claim 1, characterized in that it is used for detecting misfiring of drive devices.

* * * * *